United States Patent
Ball

(10) Patent No.: US 6,641,381 B2
(45) Date of Patent: Nov. 4, 2003

(54) WAFER DICING BLADE CONSISTING OF MULTIPLE LAYERS

(75) Inventor: Michael B. Ball, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/266,772

(22) Filed: Oct. 9, 2002

(65) Prior Publication Data

US 2003/0024522 A1 Feb. 6, 2003

Related U.S. Application Data

(62) Division of application No. 09/735,465, filed on Dec. 14, 2000.

(51) Int. Cl.$^7$ ................................................ B28D 1/04
(52) U.S. Cl. ...................... 425/15; 125/13.01; 451/540; 451/544; 451/546; 451/548
(58) Field of Search ................................ 125/13.01, 15; 451/540, 544, 546, 548

(56) References Cited

U.S. PATENT DOCUMENTS

| | | | |
|---|---|---|---|
| 4,644,703 A | 2/1987 | Kaczmarek et al. | |
| 6,207,294 B1 | 3/2001 | Rutter | |
| 6,276,995 B1 * | 8/2001 | Matsuta et al. | ............... 451/41 |
| 6,286,498 B1 | 9/2001 | Sung | |

* cited by examiner

*Primary Examiner*—Joseph J. Hail, III
*Assistant Examiner*—Shantese McDonald
(74) *Attorney, Agent, or Firm*—Dickstein Shapiro Morin & Oshinsky LLP

(57) ABSTRACT

The present invention provides a multi-layered diamond dicing blade. More particularly, the blade is a multi-layered dicing blade comprising an inner layer with a first set of diamond particles and an outer layer overlying the inner layer. The inner layer extends to the outermost periphery of the dicing blade. The outer layer comprises a second set of diamond particles having a size smaller than the first set of diamond particles.

29 Claims, 4 Drawing Sheets

WAFER DICING BLADE CONSISTING OF MULTIPLE LAYERS

This application is a divisional of Application No. 09/735,465, filed Dec. 14, 2000, the subject matter of which is incorporated by reference therein.

FIELD OF THE INVENTION

This invention relates to precision cutting of discrete devices such as semiconductor devices, more particularly, to a diamond dicing blade used for efficient and symmetric cutting with reduced chipping.

DISCUSSION OF THE RELATED ART

There are many prior art discrete devices which are formed as a plurality of substrates integrally formed in a wafer or the like which require intermediate cuts and/or separation into individual subunits as a last step in the fabrication process. Examples of such discrete devices are semiconductor devices. Most, but not all, of the devices are formed in silicon-based wafers. A preferred technique for separating the sub-units is to saw through the wafer in a procedure referred to as "dicing." The device used to perform the cutting is referred to as a dicing blade. For cutting operations requiring high precision (+/−0.5 micron), diamond blades have been preferred, especially in the production of semiconductor devices, because they form precisely placed cuts.

However, these prior art diamond blades still suffer from performance variability manifested in the asymmetric chipping of the wafer due to the forces generated when pieces of silicon particles loosen from the wafer between the rotating dicing blade and the silicon wafers being cut.

For instance, as shown in FIG. 1a, silicon wafer 8 having a frontside 10 and backside 12 is diced by a dicing blade 6 with large diamond particles 14, with a mean particle size of about 5–6 microns. Large diamond particles 14 allow for an increased feed rate or throughput and produce good backside chipping 18. However, when large particles 14 are used they present the problem of poor frontside chipping 16 due to the increased contact area/pressure between the large particle 14 and frontside 10. Hence, symmetric dicing on the frontside 10 and backside 12 is problematic. The large degree of frontside chipping is especially a problem because of its proximity to the fabricated circuitry which is located on wafer frontside 10.

In contrast, as shown in FIG. 1b, silicon wafer 8 having a frontside 10 and backside 12 may be diced by a dicing blade 4 with small diamond particles 20, with a mean particle size of about 1–2 microns. The small particle 20 provides minimal contact area with frontside 10 thereby allowing minimal pressure and producing good frontside chipping 3. But, small diamond particles 20 do not cut as efficiently as large particles 14 and using small particles 14 creates pressure buildup at the leading edge of the dicing blade 4 thereby causing chips to breakout ("slivering"), creating poor backside chipping 2.

Therefore what is needed is a diamond dicing blade which produces efficient, symmetric cuts with reduced chipping on both the frontside and backside of a wafer.

SUMMARY OF THE INVENTION

The present invention provides a multi-layered diamond dicing blade. More particularly, the blade is a multi-layered dicing blade comprising an inner layer with a first set of diamond particles and an outer layer overlying the inner layer. The inner layer extends to the outermost periphery of the dicing blade. The outer layer comprises a second set of diamond particles having a size smaller than the first set of diamond particles. The first set of diamond particles makes initial contact with the silicon wafer penetrating the bare silicon. The second set of diamond particles of the dicing blade provides a fine finish.

The above advantages and features of the invention will be more clearly understood from the following detailed description which is provided in connection with the accompanying drawings.

DETAILED DESCRIPTION OF THE INVENTION

Figure 1A:
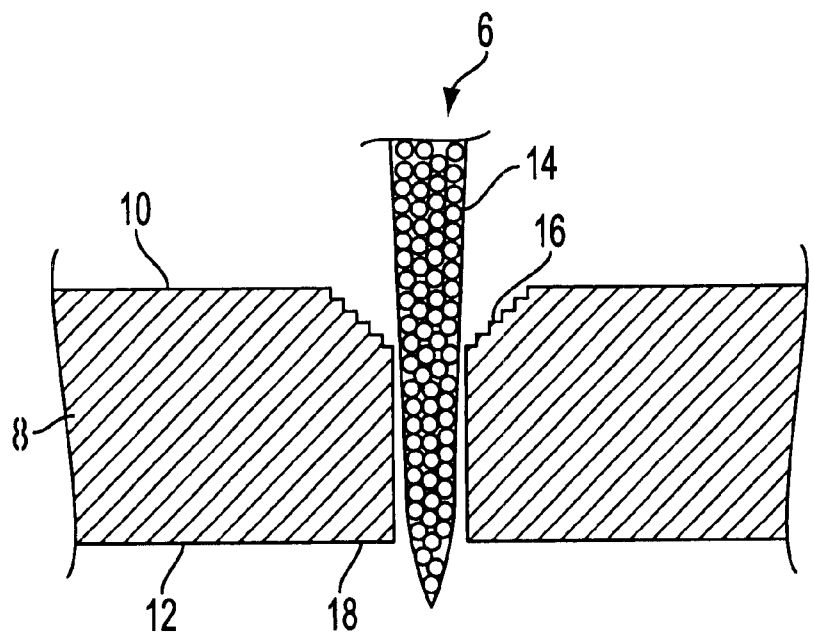
FIG. 1(a) illustrates an exploded side sectional profile of a conventional dicing blade with large diamond particles.
Figure 1B:
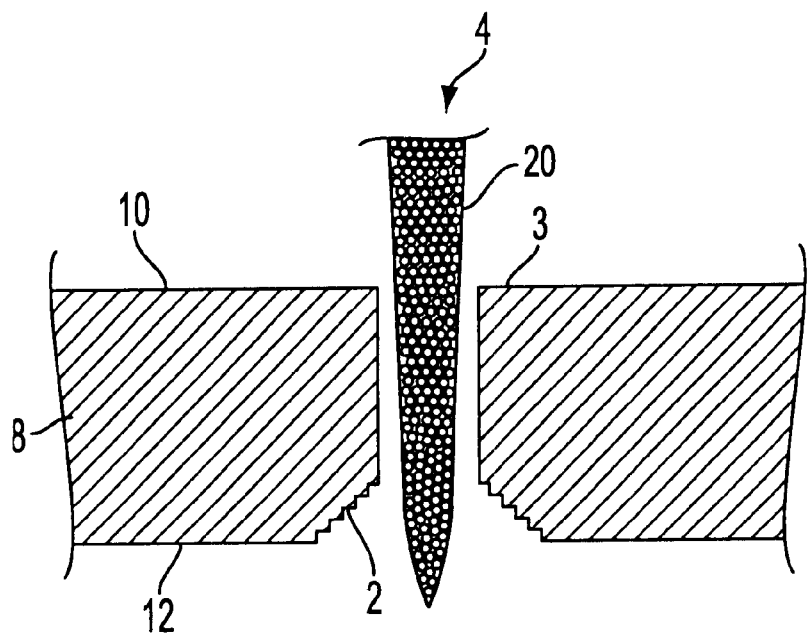
FIG. 1(b) illustrates an exploded side sectional profile of a conventional dicing blade with small diamond particles.

The present invention will be described in connection with an exemplary embodiment of a dicing blade illustrated in FIG. 2–3. Other embodiments may be utilized and structural or logical changes may be made without departing from the spirit or scope of the present invention. Although the invention is illustrated in the drawings in connection with severing semiconductor devices from wafers, the invention may also be used to cut through other objects as well. Like items are referred to by like reference numerals throughout the drawings.

Figure 2:
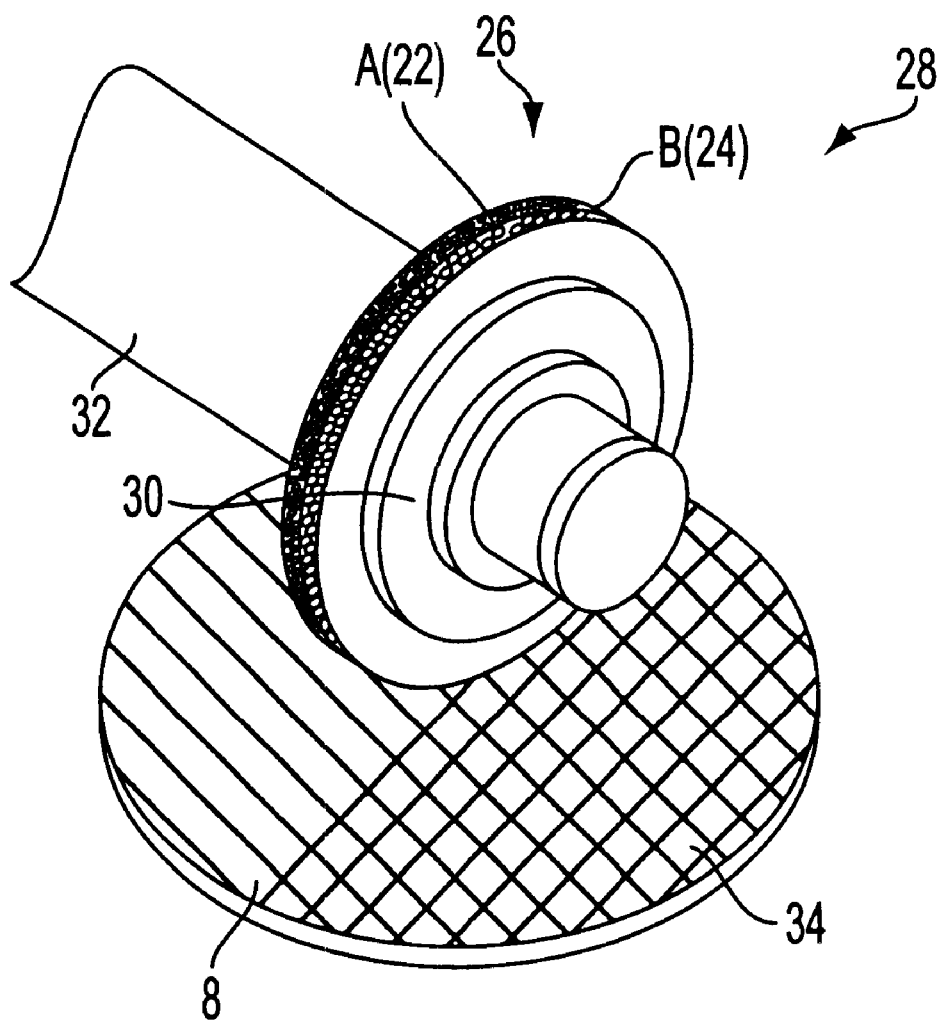
FIG. 2 illustrates a spindle mounted dicing blade of the present invention performing a cutting action across a wafer.

Referring now to FIG. 2, there is shown a wafer saw 28 formed by a hub 30 and a dicing blade 26 of the present invention. The dicing blade 26 further comprises an outer layer B containing small diamond particles 24 overlying and inner layer A containing large diamond particles 22. The hub 30 is mounted upon a rotatable spindle 32. The blade 26 is positioned in relation to a wafer 8 in order to make a plurality of parallel cuts 34 during successive passes of the rotating blade 26. After the wafer has been cut into a plurality of strips, the wafer is rotated 90° and a plurality of second cuts are made. The second cuts segment a plurality of dies from the wafer 8.

Figure 4:
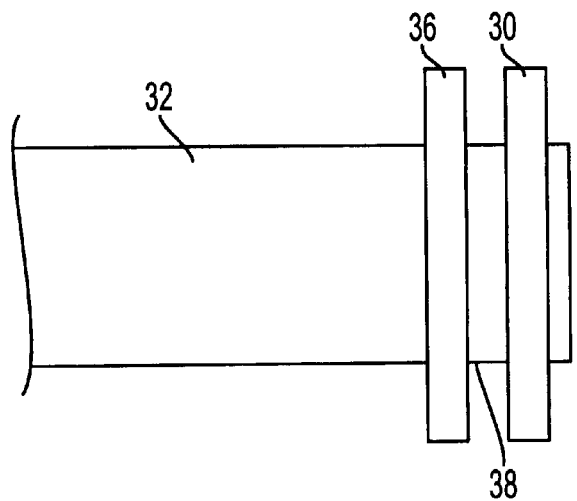
FIG. 4 illustrates an exemplary embodiment of a plating tank for fabricating the dicing blade of the present invention.
Figure 5:
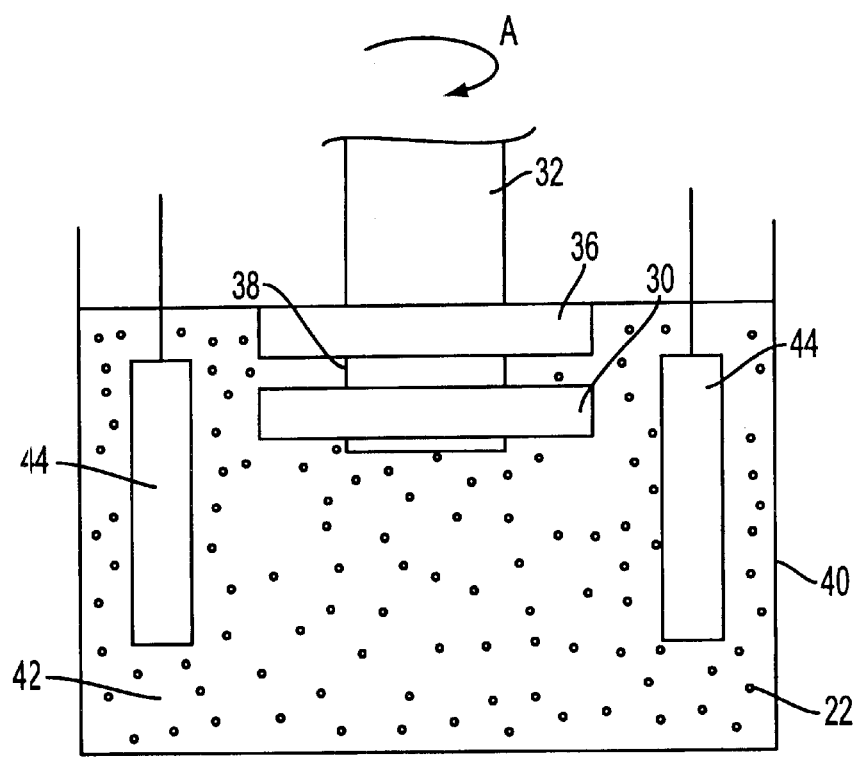
FIG. 5 illustrates an exploded side sectional view of an annular hub mounted upon a rotatable spindle for fabricating the dicing blade of the present invention.

As shown in FIG. 4, construction of the dicing blade 26 begins with a formed aluminum hub 30 mounted upon a rotatable spindle 32 supported by a support 31. An 0-ring seal or the like 36 is placed adjacent the hub 30 radially interiorly from the perimeter to serve as a mask and permits selective plating only on the annular area 38 where the dicing blade 26 is to be formed. The plating tank 40 (FIG. 5) includes a nickel plating solution 42 having large diamond particles 22 suspended therein. The nickel plating solution may be a nickel sulfamate solution sold under various trademarks, such as Allied Kelite, Enthone, SelRex, etc. The large diamond particles have a mean particle size of about 4 microns to about 8 microns. It is maintained in suspension by either mechanical or air agitation. The nickel plating tank may be of various configurations (round, square, etc.). The nickel plating solution is heated to operating temperature by using immersion heaters and automatic temperature controls to maintain a preset temperature to +/−2%. Pure nickel anodes 44 are located within the tank and at an equal spacing about the hub supporting spindle 32 (cathode). The power or current from a DC power supply is regulated to a current density (amperes per square foot of plating area) suggested by the supplier of the plating solution.

The spindle 32 is rotated (arrow A) at a predetermined speed for a predetermined duration. Rotation is thereafter stopped to permit the large diamond particles 22 to settle on the exposed annular hub 30. Rotation is subsequently reversed and then stopped. This cycle is repeated until a desired thickness of nickel and large diamond particle 22 composition is reached. Generally, the deposition rate of nickel sulfamate is approximately 0.001 inches (25.4 mm) per hour. This process is repeated utilizing small diamond particles 24, which have a mean particle size in the range of about 2 microns to about 4 microns, to fabricate a dicing blade 26 (FIG. 3) with an outer layer B overlying inner layer A containing large diamond particles 22. Next, the outermost periphery of the dicing blade is shaped to provide a sharp, precise contact point with, for instance, a semiconductor wafer.

Figure 3:
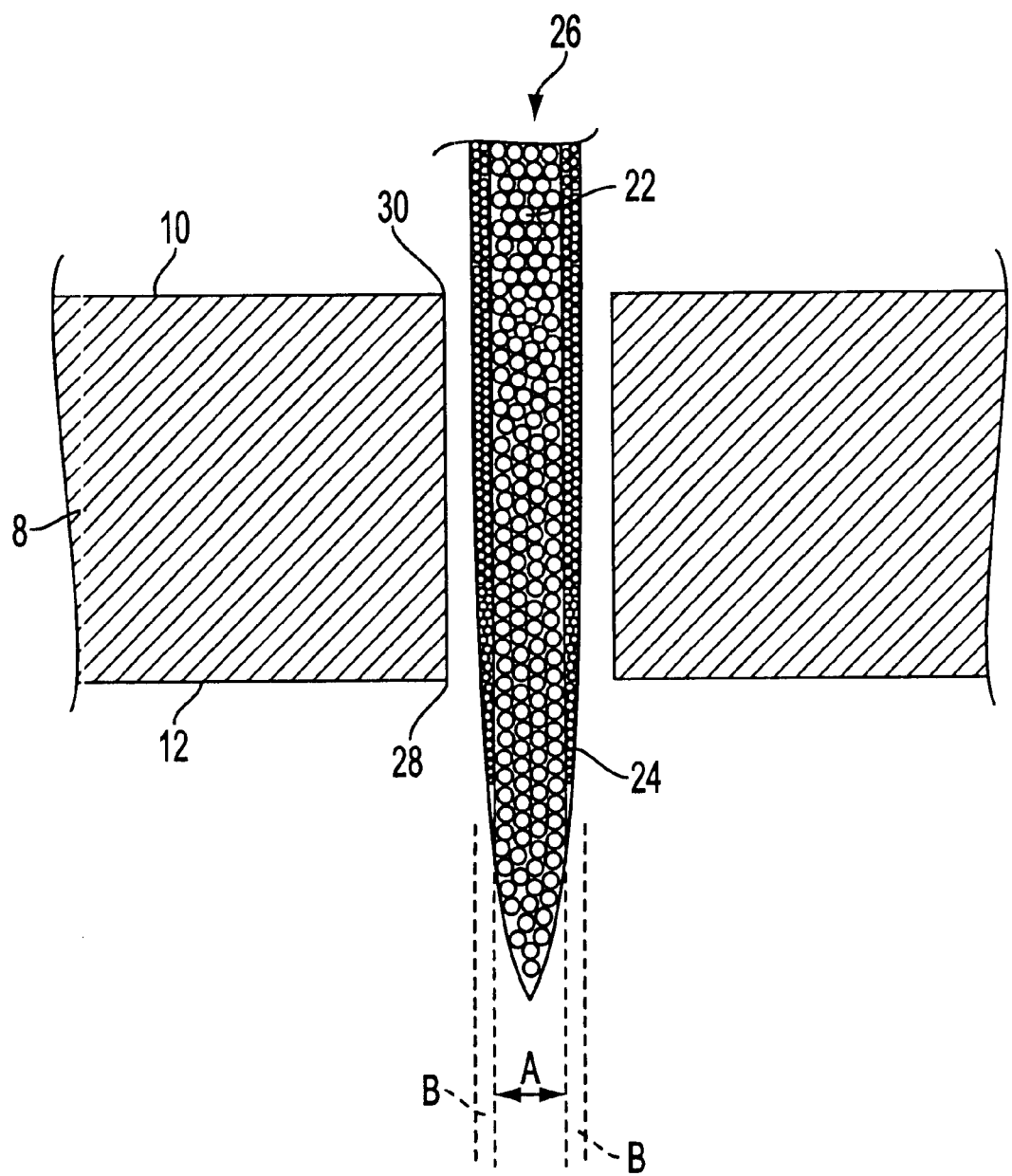
FIG. 3 illustrates an exploded side sectional profile of a dicing blade of FIG. 2 of the present invention.

Referring now to FIG. 3, there is shown an exploded side sectional view of the dicing blade 26 of the present invention. FIG. 3 shows a silicon wafer 8 having a frontside 10 and backside 12 being diced by a dicing blade 26 with an outer layer containing small diamond particles 24 overlying an inner layer containing large diamond particles 22. As noted, the small diamond particles 24 have a mean particle size of about 2 microns to about 4 microns and the large diamond particles 22 have a mean particle size of about 4 microns to about 8 microns. Blade 26 has an inner layer A with a maximum thickness of about 1.0 to about 1.2 millimeters and an outer layer B with a maximum thickness of about 0.3 to about 0.5 millimeters. As illustrated, inner layer A extends to the outermost periphery of the dicing blade 26. Hence, large diamond particles 22 of the dicing blade make initial contact with the silicon wafer 8 penetrating the bare silicon, allowing for increased throughput and efficiency. Next, small diamond particles 24 of the dicing blade provides a symmetric, fine finish. In this way, the combination of large particles 22 and small particles 24 provide good frontside clipping 30 and good backside chipping 28 of a wafer.

Hence, the invention provides a multi-layered dicing blade comprising an inner layer with a first set of diamond particles and an outer layer overlying the inner layer. The inner layer extends to the outermost periphery of the dicing blade. The outer layer comprises a second set of diamond particles having a size smaller than the first set of diamond particles.

Although the invention has been described above in connection with exemplary embodiments, it is apparent that many modifications and substitutions can be made without departing from the spirit or scope of the invention. In particular, although the invention is described with reference to a two layer dicing blade, it should be appreciated that multiple layers of large and small diamond particles may be utilized. Accordingly, the invention is not to be considered as limited by the foregoing description, but is only limited by the scope of the appended claims.

What is claimed as new and desired to be protected by Letters Patent of the United States is:

1. A dicing saw comprising:
   a rotatable spindle; and
   at least one dicing blade coupled to said spindle, said dicing blade comprising:
      an inner layer containing a first set of dicing particles and an outer layer containing a second set of dicing particles overlying said inner layer, said second set of dicing particles having a mean particle size which is smaller than a mean particle size of said first set of dicing particles; and
      wherein said inner layer extends beyond said outer layer to the outermost periphery of said dicing blade.

2. The saw of claim 1 wherein said dicing particles are diamond particles.

3. The saw of claim 1 wherein said first set of dicing particles have a mean particle size of about 4 microns to about 8 microns.

4. The saw of claim 1 wherein said second set of dicing particles have a mean particle size of about 2 microns to about 4 microns.

5. The saw of claim 1 wherein said inner layer has a maximum thickness of about 1.0 to about 1.2 millimeters.

6. The saw of claim 1 wherein said outer layer has a maximum thickness of about 0.3 to about 0.5 millimeters.

7. The saw of claim 1 wherein said saw is used for dicing semiconductor wafers.

8. An apparatus for dicing objects comprising:
   a first support for supporting said objects;
   a second support for supporting a dicing saw to dice said objects, said dicing saw comprising:
      a rotatable spindle; and
      at least one dicing blade coupled to said spindle, said dicing blade comprising:
         an inner layer containing a first set of dicing particles and an outer layer containing a second set of dicing particles overlying said inner layer, said second set of dicing particles having a mean particle size which is smaller than a mean particle size of said first set of dicing particles; and
         wherein said inner layer extends beyond said outer layer to the outermost periphery of said dicing blade.

9. The apparatus of claim 8 wherein said dicing particles are diamond particles.

10. The apparatus of claim 8 wherein said first set of dicing particles have a mean particle size of about 4 microns to about 8 microns.

11. The apparatus of claim 8 wherein said second set of dicing particles have a mean particle size of about 2 microns to about 4 microns.

12. The apparatus of claim 8 wherein said inner layer has a maximum thickness of about 1.0 to about 1.2 millimeters.

13. The apparatus of claim 8 wherein said outer layer has a maximum thickness of about 0.3 to about 0.5 millimeters.

14. The apparatus of claim 8 wherein said objects are semiconductor wafers.

15. An apparatus for dicing semiconductor wafers comprising:
   a first wafer support;
   a second support for supporting a dicing saw to dice a wafer placed on said support, said dicing saw comprising:
      a rotatable spindle; and
      at least one dicing blade coupled to said spindle, said dicing blade comprising:

an inner layer containing a first set of dicing particles and an outer layer containing a second set of dicing particles overlying said inner layer, said second set of dicing particles having a mean particle size which is smaller than a mean particle size of said first set of dicing particles; and wherein said inner layer extends beyond said outer layer to the outermost periphery of said dicing blade.

16. The apparatus of claim 15 wherein said dicing particles are diamond particles.

17. The apparatus of claim 15 wherein said first set of dicing particles have a mean particle size of about 4 microns to about 8 microns.

18. The apparatus of claim 15 wherein said second set of dicing particles have a mean particle size of about 2 microns to about 4 microns.

19. The apparatus of claim 15 wherein said inner layer has a maximum thickness of about 1.0 to about 1.2 millimeters.

20. The apparatus of claim 15 wherein said outer layer has a maximum thickness of about 0.3 to about 0.5 millimeters.

21. A method of fabricating a dicing saw comprising the acts of:

providing a spindle;

forming at least one dicing blade coupled to said spindle, said dicing blade being formed by the acts of:
    forming an inner layer containing a first set of dicing particles and an outer layer containing a second set of dicing particles overlying said inner layer, said second set of dicing particles having a mean particle size which is smaller than a mean particle size of said first set of dicing particles; and
    wherein said inner layer extends to the outermost periphery of said dicing blade.

22. The method of claim 21 wherein said dicing particles are diamond particles.

23. A method of fabricating a dicing blade comprising the acts of:

providing a cathode on which plating can occur;

providing a first plating bath including a first set of large dicing particles and anodes about equally spaced from said cathode when emersed in said first plating bath;

emersing said cathode in said first plating bath;

rotating said cathode within said first plating bath at a predetermined speed for a predetermined duration to form an inner layer on said cathode containing said large dicing particles;

providing a second plating bath including a second set of small dicing particles and anodes about equally spaced from said cathode when emersed in said second plating bath;

emersing said cathode in said second plating bath;

rotating said cathode within said second plating bath at a predetermined speed for a predetermined duration to form an outer layer on said cathode containing said small dicing particles; and forming said inner and outer layer such that said inner layer extends beyond said outer layer to the outermost periphery of said dicing blade.

24. The method of claim 23 further comprising the act of stopping and reversing said rotation until a desired thickness of said inner layer is reached.

25. The method of claim 23 wherein said first set of dicing particles have a mean particle size of about 4 microns to about 8 microns.

26. The method of claim 23 wherein said second set of dicing particles have a mean particle size of about 2 microns to about 4 microns.

27. The method of claim 23 wherein said inner layer has a maximum thickness of about 1.0 to about 1.2 millimeters.

28. The method of claim 23 wherein said outer layer has a maximum thickness of about 0.3 to about 0.5 millimeters.

29. The method of claim 23 wherein said particles are diamond particles.

* * * * *